(12) United States Patent
Kim et al.

(10) Patent No.: US 10,478,779 B2
(45) Date of Patent: Nov. 19, 2019

(54) HOLLOW FIBER MEMBRANE MODULE

(71) Applicant: KOLON INDUSTRIES, INC., Gwacheon-si, Gyeonggi-do (KR)

(72) Inventors: Kyoung Ju Kim, Yongin-si (KR); Young Seok Oh, Yongin-si (KR); Jin Hyung Lee, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 116 days.

(21) Appl. No.: 15/128,750

(22) PCT Filed: Mar. 23, 2015

(86) PCT No.: PCT/KR2015/002840
§ 371 (c)(1),
(2) Date: Sep. 23, 2016

(87) PCT Pub. No.: WO2015/147511
PCT Pub. Date: Oct. 1, 2015

(65) Prior Publication Data
US 2017/0100701 A1    Apr. 13, 2017

(30) Foreign Application Priority Data

Mar. 24, 2014  (KR) .......................... 10-2014-0033834

(51) Int. Cl.
*B01D 63/04* (2006.01)
*B01D 63/02* (2006.01)
*H01M 8/04119* (2016.01)

(52) U.S. Cl.
CPC ............. *B01D 63/04* (2013.01); *B01D 63/02* (2013.01); *B01D 63/043* (2013.01);
(Continued)

(58) Field of Classification Search
CPC .......... B01D 2313/08; B01D 2313/083; B01D 2313/26; B01D 2319/04; B01D 53/22;
(Continued)

(56) References Cited

U.S. PATENT DOCUMENTS

2012/0111967 A1   5/2012  Katagiri et al.
2012/0231357 A1   9/2012  Kim et al.
(Continued)

FOREIGN PATENT DOCUMENTS

CN          103000919 A      3/2013
EP          1 137 478 A1    10/2001
(Continued)

OTHER PUBLICATIONS

Japanese Patent Office, Communication dated Jul. 18, 2017 by the Japanese Patent Office in counterpart Japanese Application No. 2016-558034.
(Continued)

*Primary Examiner* — John Kim
(74) *Attorney, Agent, or Firm* — Sughrue Mion, PLLC

(57) ABSTRACT

Disclosed is a hollow fiber membrane module. The hollow fiber membrane module includes a housing including a first fluid inlet, a first fluid outlet, a second fluid inlet and a second fluid outlet, and hollow fiber membrane bundles, each hollow fiber membrane bundle including a plurality of hollow fiber membranes, disposed within the housing so that a first fluid flows inside the hollow fiber membranes and a second fluid flows outside the hollow fiber membranes, and each hollow fiber membrane bundle further includes porous tubes having both ends closed and including a plurality of pores formed on the side surfaces thereof. The hollow fiber membrane module removes a region, into which a fluid flowing outside a hollow fiber membrane bundle has difficulty in permeating, thus allowing the fluid to uniformly (Continued)

flow. Therefore, even if hollow flow membranes are highly integrated, performance of the hollow fiber membrane module may be maximized.

11 Claims, 7 Drawing Sheets

(52) U.S. Cl.
CPC ..... *H01M 8/04149* (2013.01); *B01D 2313/08* (2013.01); *B01D 2313/083* (2013.01); *B01D 2313/26* (2013.01); *B01D 2319/04* (2013.01)

(58) Field of Classification Search
CPC ...... B01D 63/02; B01D 63/04; B01D 63/043; H01M 8/04149
See application file for complete search history.

(56) References Cited

U.S. PATENT DOCUMENTS

| | | |
|---|---|---|
| 2013/0065140 A1 | 3/2013 | Kim et al. |
| 2013/0137005 A1 | 5/2013 | Kim et al. |

FOREIGN PATENT DOCUMENTS

| | | |
|---|---|---|
| JP | 02107317 A | 4/1990 |
| JP | 2725312 B2 | 3/1998 |
| JP | 2011-85309 | 4/2011 |
| KR | 10-2010-0100325 A | 9/2010 |
| KR | 10-1160342 B1 | 6/2012 |
| KR | 10-2013-0011394 A | 1/2013 |
| KR | 10-2013-0029306 A | 3/2013 |
| WO | 2013/133625 A1 | 9/2013 |

OTHER PUBLICATIONS

International Searching Authority, International Search Report of PCT/KR2015/002840 dated Jun. 25, 2015.
European Patent Office, Communication dated Oct. 17, 2017, issued in counterpart European Application No. 15768607.2.
State Intellectual Property Office of the P.R.C ;Communication dated Mar. 5, 2018, in counterpart application No. 201580012937.3.

HOLLOW FIBER MEMBRANE MODULE

CROSS REFERENCE TO RELATED APPLICATIONS

This application is a National Stage of International Application No. PCT/KR2015/002840 filed Mar. 23, 2015, claiming priority based on Korean Patent Application No. 10-2014-0033834 filed Mar. 24, 2014, the contents of all of which are incorporated herein by reference in their entirety.

BACKGROUND OF THE INVENTION

Field of the Invention

The present invention relates to a hollow fiber membrane module and, more particularly, to a hollow fiber membrane module which removes a region, into which a fluid flowing outside a hollow fiber membrane bundle has difficulty in permeating, so that the fluid uniformly flows and thus, even if hollow flow membranes are highly integrated, performance of the hollow fiber membrane module may be maximized.

The hollow fiber membrane module may be a water exchange module, a heat exchange module, a gas separation module or a water treatment module.

Description of the Related Art

In general, a fuel cell refers to a power generation-type cell which produces electricity by bonding hydrogen and oxygen. The fuel cell may continuously produce electricity as long as hydrogen and oxygen are supplied, differently from general chemical cells, such as batteries or storage batteries, and have no heat loss, thus having efficiency twice that of an internal combustion engine. Further, the fuel cell converts chemical energy, generated by bonding hydrogen and oxygen, directly into electrical energy and thus discharges few pollutants. Therefore, the fuel cell is advantageous in that it is eco-friendly and reduces worries about resource depletion owing to increase in energy consumption. Fuel cells may be generally classified into a polymer electrolyte membrane fuel cell (PEMFC), a phosphoric acid fuel cell (PAFC), a molten carbonate fuel cell (MCFC), a solid oxide fuel cell (SOFC), an alkaline fuel cell (AFC), etc. according to kinds of electrolytes used. The respective fuel cells are basically operated by the same principle, but kinds of fuels used, operating temperatures, catalysts, electrolytes, etc., of the respective fuel cells are different. Thereamong, it is known that the PEMFC is operated at a low temperature, as compared to other fuel cells, has high power density, is small-sized, and may thus be promising as small mounting-type power generation equipment but also transportation systems.

One of important factors to improve performance of the PEMFC is to supply moisture of a designated amount or more to a polymer electrolyte membrane or a proton exchange membrane (PEM) of a membrane-electrolyte assembly (MEA) so as to maintain a desired water content. The reason for this is that, when the PEM is dried, power generation efficiently is rapidly decreased. In order to humidify the PEM, 1) a bubbler humidification method in which moisture is supplied by filling a pressure vessel with water and then causing target gas to pass through a diffuser, 2) a direct injection method in which an amount of supply moisture necessary for fuel cell reaction is calculated and then moisture is supplied directly to a gas flow pipe through a solenoid valve, and 3) a humidification membrane method in which moisture is supplied to a gas fluidized bed using a polymeric separation membrane. Thereamong, the humidification membrane method, in which vapor is fed to gas supplied to a polymer electrolyte membrane using a membrane selectively transmitting only vapor included in exhaust gas so as to humidify the polymer electrolyte membrane, is advantageous in that a humidifier may be lightweight and small.

As selectively permeable membranes used in the humidification membrane method, hollow fiber membranes in which, if a module is formed, a transmission area per unit volume is large, are preferably used. That is, if a humidifier is manufactured using the hollow fiber membranes, high integration of the hollow fiber membranes having a large contact surface area is achieved and a fuel cell may be sufficiently humidified at a small capacity, a low-cost material may be used, and moisture and heat included in unreacted gas of a high temperature discharged from the fuel cell may be collected and reused through the humidifier.

However, in the case of a humidifier using hollow fiber membranes, in order to increase the capacity of the humidifier, many hollow fiber membranes are integrated. Here, a gas flow at the outside of the hollow fiber membranes is not uniform throughout the inside of the humidifier due to resistance of the highly integrated hollow fiber membranes.

In order to solve such a problem, the thickness of a hollow fiber membrane bundle is restricted or the hollow fiber membrane bundle is divided. However, in this case, another problem, i.e., a limit on mounting of the hollow fiber membranes in a confined space, may be caused.

PRIOR ART DOCUMENT

Patent Document (PATENT DOCUMENT 1) Korean Patent Laid-Open Publication No. 10-2009-0013394 (Publication Date: Feb. 5, 2009)
(PATENT DOCUMENT 2) Korean Patent Laid-Open Publication No. 10-2009-0057773 (Publication Date: Jun. 8, 2009)
(PATENT DOCUMENT 3) Korean Patent Laid-Open Publication No. 10-2009-0128005 (Publication Date: Dec. 15, 2009)
(PATENT DOCUMENT 4) Korean Patent Laid-Open Publication No. 10-2010-0108092 (Publication Date: Oct. 6, 2010)
(PATENT DOCUMENT 5) Korean Patent Laid-Open Publication No. 10-2010-0131631 (Publication Date: Dec. 16, 2010)
(PATENT DOCUMENT 6) Korean Patent Laid-Open Publication No. 10-2011-0001022 (Publication Date: Jan. 6, 2011)
(PATENT DOCUMENT 7) Korean Patent Laid-Open Publication No. 10-2011-0006122 (Publication Date: Jan. 20, 2011)
(PATENT DOCUMENT 8) Korean Patent Laid-Open Publication No. 10-2011-0006128 (Publication Date: Jan. 20, 2011)
(PATENT DOCUMENT 9) Korean Patent Laid-Open Publication No. 10-2011-0021217 (Publication Date: Mar. 4, 2011)
(PATENT DOCUMENT 10) Korean Patent Laid-Open Publication No. 10-2011-0026696 (Publication Date: Mar. 16, 2011)
(PATENT DOCUMENT 11) Korean Patent Laid-Open Publication No. 10-2011-0063366 (Publication Date: Jun. 10, 2011)

SUMMARY OF THE INVENTION

Therefore, the present invention has been made in view of the above problems, and it is an object of the present invention to provide a hollow fiber membrane module which removes a region, into which a fluid flowing outside a hollow fiber membrane bundle has difficulty in permeating, so that the fluid uniformly flows and thus, even if hollow flow membranes are highly integrated, performance of the hollow fiber membrane module may be maximized.

In accordance with an aspect of the present invention, the above and other objects can be accomplished by the provision of a hollow fiber membrane module including a housing including a first fluid inlet, a first fluid outlet, a second fluid inlet and a second fluid outlet, and hollow fiber membrane bundles, each hollow fiber membrane bundle including a plurality of hollow fiber membranes, disposed within the housing so that a first fluid flows inside the hollow fiber membranes and a second fluid flows outside the hollow fiber membranes, wherein each hollow fiber membrane bundle further includes porous tubes having both ends closed and including a plurality of pores formed on the side surfaces thereof.

The porous tubes may be disposed so that the length direction of the porous tubes coincides with the length direction of the hollow fiber membrane bundles.

The side surfaces of the porous tubes may be formed in a mesh type.

The diameter of the porous tubes may be 2 to 20 times the diameter of the hollow fiber membranes.

The diameter of the pores of the porous tubes may be 1 to 10 mm.

A ratio of the whole area of the pores of the porous tube to the whole area of the side surface of the porous tube may be 10 to 50% by area.

The porous tubes may be provided in plural such that porous tube is provided per 200 to 2000 hollow fiber membranes.

The hollow fiber membrane bundles may be provided in plural, and the hollow fiber membrane module may further include diaphragms configured to divide the hollow fiber membrane bundles with each other.

The diaphragms may be provided in plural and disposed so as to surround the respective hollow fiber membrane bundles.

Fluid flow holes may be formed through the diaphragms.

The cross-section of the housing may have a circular shape or a polygonal shape.

The housing may further include a housing body having both ends opened and including the first fluid inlet and the first fluid outlet formed on the outer surface thereof, and housing caps combined with the respective ends of the housing body and including the second fluid inlet and the second fluid outlet.

The hollow fiber membrane module may further include potting parts configured to fix both ends of the hollow fiber membranes to the housing and contacting both ends of the housing so as to be sealable.

The hollow fiber membrane module may be any one selected from the group consisting of a water exchange module, a heat exchange module, a gas separation module and a water treatment module.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Reference will now be made in detail to the preferred embodiments of the present invention, examples of which are illustrated in the accompanying drawings. However, those skilled in the art will appreciate that various modifications, additions and substitutions are possible, and the present invention is not limited to these embodiments.

Figure 1:
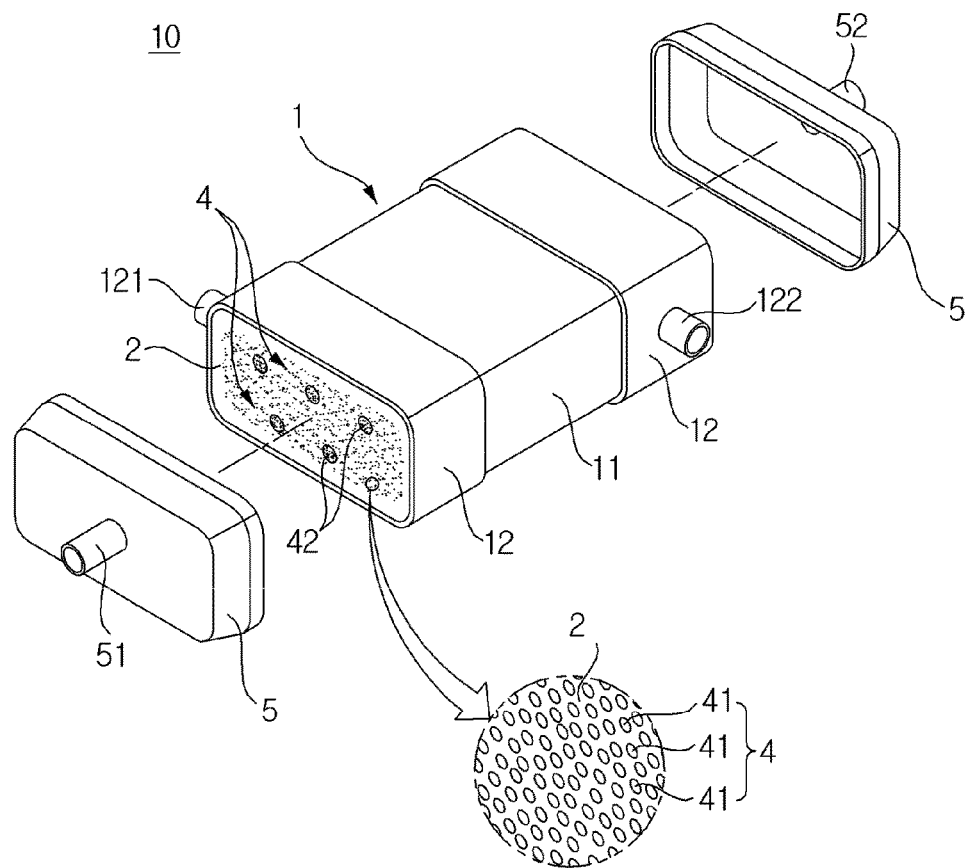
FIG. 1 is a partially exploded perspective view of a hollow fiber membrane module in accordance with one embodiment of the present invention.
Figure 2:
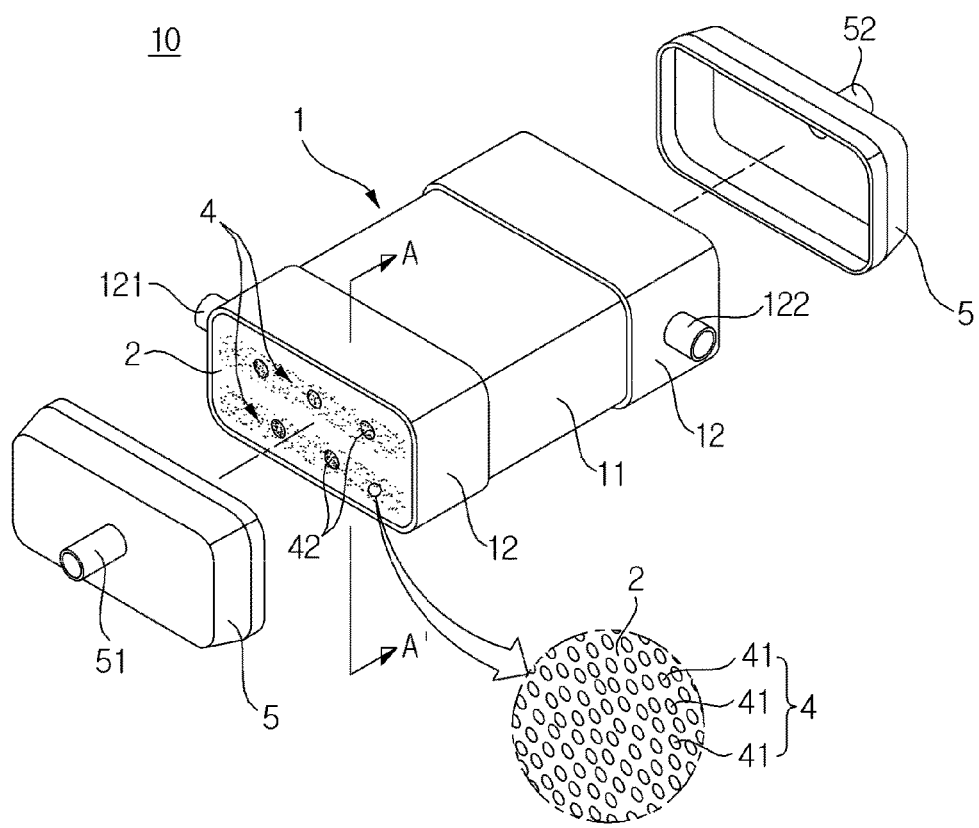
FIG. 2 is a partially exploded perspective view of a hollow fiber membrane module in accordance with another embodiment of the present invention.
Figure 3:
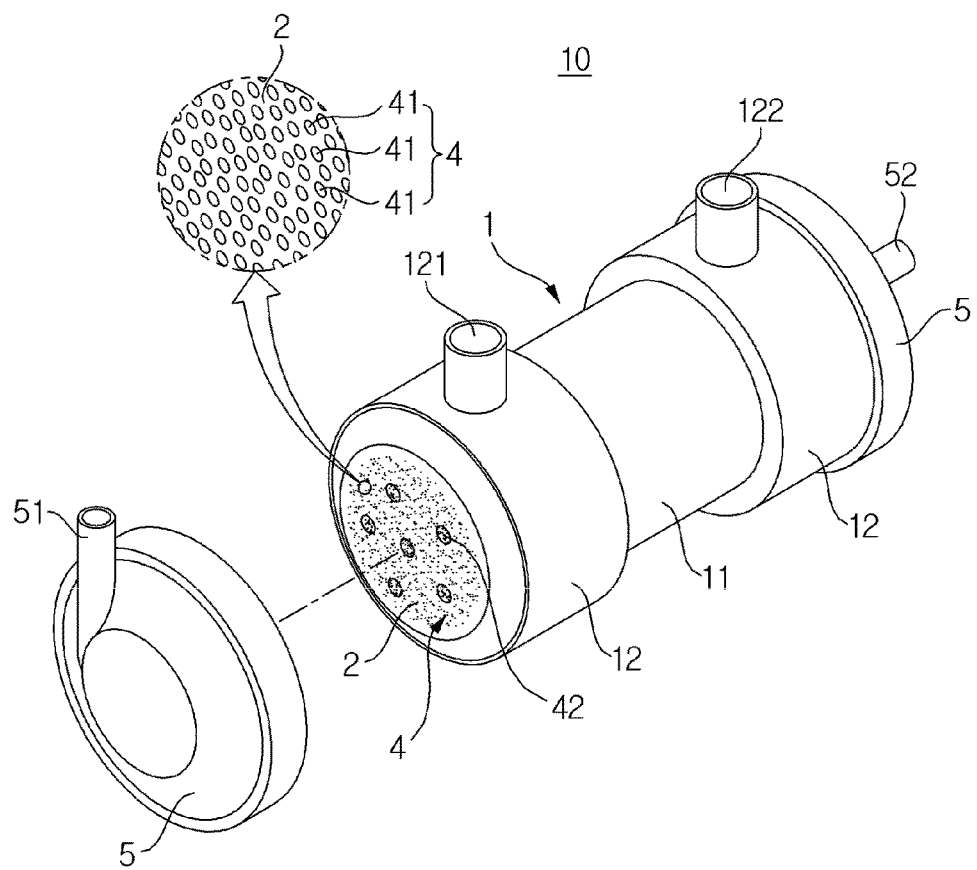
FIG. 3 is a partially exploded perspective view of a hollow fiber membrane module in accordance with yet another embodiment of the present invention.
Figure 4:
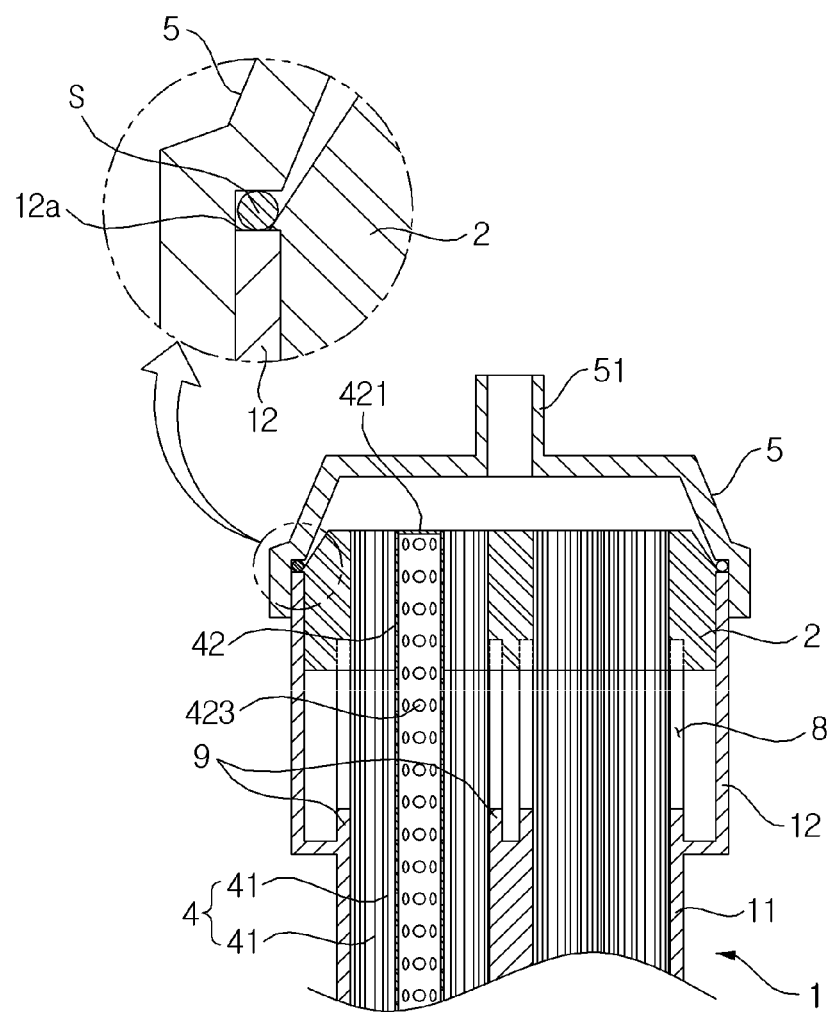
FIG. 4 is a partial cross-sectional view taken along line A-A' of the hollow fiber membrane module of FIG. 2.

FIG. 1 is a partially exploded perspective view of a hollow fiber membrane module in accordance with one embodiment of the present invention, FIG. 2 is a partially exploded perspective view of a hollow fiber membrane module in accordance with another embodiment of the present invention, FIG. 3 is a partially exploded perspective view of a hollow fiber membrane module in accordance with yet another embodiment of the present invention, and FIG. 4 is a partial cross-sectional view taken along line A-A' of the hollow fiber membrane module of FIG. 2. As hollow fiber membrane modules shown in FIGS. 1 to 4, water exchange modules are exemplarily illustrated. However, the hollow fiber membrane modules are not limited to water exchange modules and may be heat exchange modules, gas separation modules, water treatment modules, etc.

Hereinafter, with reference to FIGS. 1 to 4, a hollow fiber membrane module will be described. As exemplarily shown in FIGS. 1 to 4, a hollow fiber membrane module 10 includes a housing 1, hollow fiber membrane bundles 4, and potting parts 2.

The housing 1 forms the external appearance of the hollow fiber membrane module 10. The housing 1 may include a housing body 11 and housing caps 5 and be an integral type in which the housing body 11 and the housing caps 5 are combined. The housing body 11 and the housing caps 5 may be formed of hard plastic, such as polycarbonate, or metal. Further, the cross-sections of the housing body 11 and the housing caps 5 in the width direction may have a polygonal shape, as exemplarily shown in FIGS. 1 and 2, or have a circular shape, as exemplarily shown in FIG. 3. The polygonal shape may be a rectangle, a square, a trapezoid, a parallelogram, a pentagon or a hexagon, and the polygonal shape may be a shape having rounded corners. Further, the circular shape may be an oval.

The housing 1 may further include circumferential parts 12 formed at both ends of the housing body 11 to extend the circumference of the housing body 11. In this case, both opened ends of the circumferential parts 12 are embedded in the potting parts 2 and the potting parts 2 are surrounded by the circumferential parts 12. A second fluid inlet 121 to which a second fluid is supplied and a second fluid outlet 122 from which the second fluid is discharged are formed on the circumferential parts 12.

The hollow fiber membrane bundles 4, each of which includes a plurality of hollow fiber membranes 41 selectively transmitting moisture, are installed in the housing 1. Here, the hollow fiber membranes 41 may be formed of known materials and a detailed description thereof will thus be omitted.

The potting parts 2 bind the hollow fiber membranes 41 at both ends of the hollow fiber membrane bundles 4 and fill pores between the hollow fiber membranes 41. The potting parts 2 may contact the inner surfaces of both ends of the housing body 11 and hermetically seal the housing body 11. The potting parts 2 may be formed of known materials and a detailed description thereof will thus be omitted.

The potting parts 2 are formed at the insides of both ends of the housing body 11 and thus both ends of the hollow fiber membrane bundles 4 are fixed to the housing body 11. Thereby, both ends of the housing body 11 are closed by the potting parts 2 and thus a flow path along which the second fluid passes is formed in the housing body 11.

The housing caps 5 are combined with both ends of the housing body 11. A first fluid inlet 51 and a first fluid outlet 52 are formed on the housing caps 5. A first fluid introduced into the first fluid inlet 51 of one housing cap 5 passes through inner ducts of the hollow fiber membranes 41 and is discharged from the first fluid outlet 52 of the other housing cap 5.

With reference to FIG. 4, the potting part 2 may be formed so as to be inclined upward from an approximately central portion of a tip 12a of the circumferential part to the center of the housing body 11, and the hollow fiber membranes 41 pass through the potting part 2 so that the ducts of the hollow fiber membranes 41 are exposed at the end of the potting part 2. A sealing member S may be attached to the tip 12a of the circumferential part 12, which is not shielded by the potting part 2, and the housing cap 5 may apply pressure to the sealing member S and thus be combined with the housing body 11.

The hollow fiber membrane module 10 may include a plurality of hollow fiber membrane bundles 4 and diaphragms 9 to divide the hollow fiber membrane bundles 4 from each other. Fluid flow holes 8 are formed in the diaphragms 9 so that the second fluid may pass through the diaphragms 9 through the fluid flow holes 8 and flow to the outside of the hollow fiber membrane bundles 4.

Further, a plurality of diaphragms 9 may be provided, and the diaphragms 9 may be disposed so as to surround the respective hollow fiber membrane bundles 4 and thus divide the hollow fiber membrane bundles 4 from each other.

The first fluid is supplied to the inside of the housing 1 through the first fluid inlet 51 of one housing cap 5, flows into the hollow fiber membranes 41, and is discharged to the outside of the hollow fiber membrane module 10 through the first fluid outlet 52 of the other housing cap 5. However, the first fluid may be introduced into the first fluid outlet 52 and then be discharged from the first fluid inlet 51. On the other hand, the second fluid is supplied to one circumferential part 12 of the housing body 11 through the second fluid inlet 121 of the housing body 11, passes through the diaphragms 9 through the fluid flow holes 8, each of which is formed at one side of each of the diaphragms 9, flows to the outside of the hollow fiber membranes 41, is discharged to the other circumferential part 12 of the housing body 11 through the fluid flow holes 8, each of which is formed at the other side of each of the diaphragms 9, and is discharged to the outside of the housing 1 through the second fluid outlet 122 of the housing body 11. However, the second fluid may be introduced into the second fluid outlet 122 and then be discharged from the second fluid inlet 121. That is, the first fluid and the second fluid may flow in opposite directions or flow in the same direction. The first fluid and the second fluid respectively flow inside and outside the hollow fiber membranes 41 and exchange substances, such as moisture, or heat through the hollow fiber membranes 41.

The first fluid may be a low-humidity fluid and the second fluid may be a high-humidity fluid, or the second fluid may be a low-humidity fluid and the first fluid may be a low-humidity fluid.

The hollow fiber membrane bundle 4 includes a porous tube 42 having both ends closed, including a plurality of pores formed on the side surface thereof, and disposed between the hollow fiber membranes 41. The porous tube 42 may be disposed so that the length direction of the porous tube 42 coincides with the length direction of the hollow fiber membranes 41.

The hollow fiber membrane bundle 4 may include one porous tube 42 or include a plurality of porous tubes 42. If the hollow fiber membrane module 10 includes a plurality of hollow fiber membrane bundles 4, each hollow fiber membrane bundle 4 may include one porous tube 42 or include a plurality of porous tubes 42. Here, the porous tubes 42 may be disposed at random positions between the hollow fiber membranes 41 or be disposed at designated intervals.

The porous tubes 42 including the pores formed on the side surfaces thereof may guide the uniform flow of the second fluid into the porous tubes 42, thus maximizing operating efficiency of the hollow fiber membrane module 10. That is, the porous tubes 42 may remove a region, into which the second fluid has difficulty in permeating, and thus maximize performance of the hollow fiber membrane module 10 even if the hollow flow membranes 41 are highly integrated.

Figure 5:
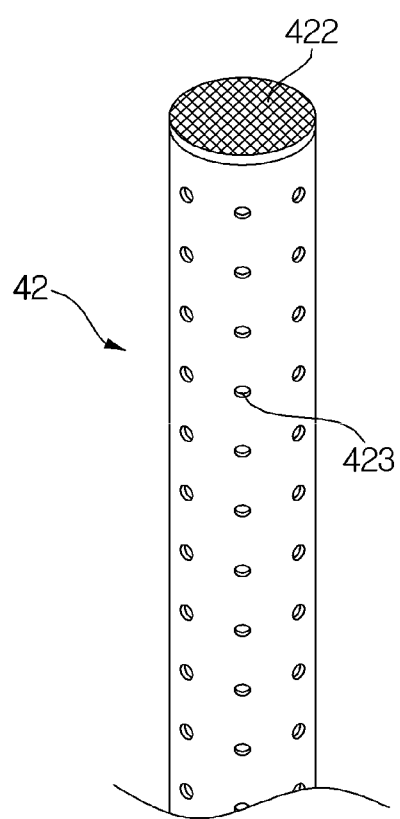
FIGS. 5 to 7 are views schematically illustrating porous tubes in accordance with different embodiments of the present invention.
Figure 6:
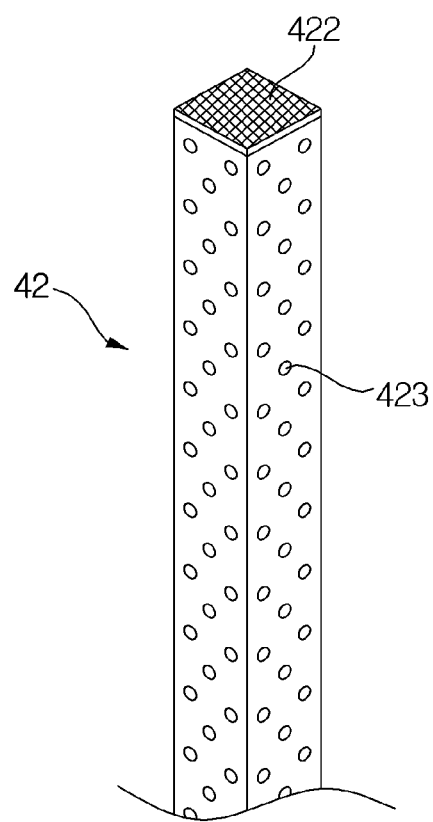
Figure 7:
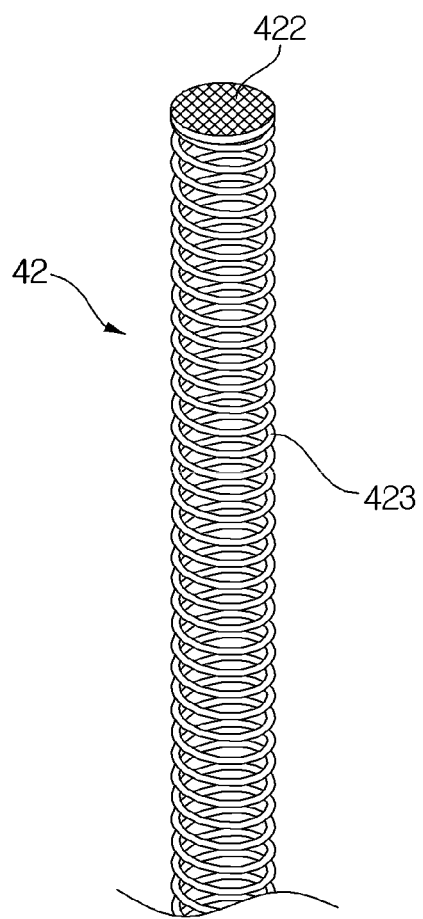

FIGS. 5 to 7 are views schematically illustrating porous tubes 42 in accordance with different embodiments of the present invention. Hereinafter, with reference to FIGS. 5 to 7, shapes of the porous tubes 42 will be described in detail.

With reference to FIGS. 5 to 7, both ends 422 of the porous tube 42 are closed. The reason for this is to prevent the first fluid, supplied into the housing 1 through the first fluid inlet 51 of the housing cap 5, from flowing into the porous tube 42. The porous tube 42 may be formed under the condition that both ends 422 of the porous tube 42 are closed, or both ends 422 of the porous tube 42 may be closed by the potting parts 2 during the manufacturing process of the hollow fiber membrane module 10.

The inside of the porous tube 42 may be vacant, and a plurality of pores 423 may be formed on the side surface of the porous tube 42 so that the second fluid may be introduced into the porous tube 42 through the pores 423 and flow inside the porous tube 42. Therefore, the porous tube 42 may serve to guide the uniform flow of the second fluid and to remove a region, into which the second fluid has difficulty in permeating, even if the hollow flow membranes 41 are highly integrated.

The cross-section of the porous tube 42 in the width direction may have a circular shape, as exemplarily shown in FIG. 5, or have a polygonal shape, as exemplarily shown in FIG. 6. The circular shape may be an oval, and the polygonal shape may be a rectangle, a square, a trapezoid, a parallelogram, a pentagon or a hexagon, and be a shape having rounded corners.

The pores 423 of the porous tube 42 may be formed through a conventional method, such as punching, or the porous tube 42 may be formed of a porous material, such as a mesh, as exemplarily shown in FIG. 7.

The diameter of the pores 423 of the porous tube 42 may be 1 to 10 mm, preferably 2 to 8 mm, and more preferably 3 to 5 mm. If the diameter of the pores 423 is less than 1 mm, a fluid flow amount through the pores 423 of the porous tube 42 may be small and, if the diameter of the pores 423 exceeds 10 mm, a fluid flow amount may be excessively increased and cause concentration of inflow fluid.

The whole area of the pores 423 of the porous tube 42 may be 10 to 50% by area, preferably 20 to 40% by area, and more preferably 25 to 35% by area to the whole area of the side surface of the porous tube 42. Here, % by area is a value, acquired by dividing the whole area of the pores 423 by the area of the side surface of the porous tube 42 and then multiplying by 100.

If the whole area of the pores 423 of the porous tube 42 is less than 10% by area to the whole area of the side surface of the porous tube 42, a fluid flow amount through the pores 423 of the porous tube 42 may be small and, if the whole area of the pores 423 of the porous tube 42 exceeds 50% by area to the whole area of the side surface of the porous tube 42, it may be difficult to manufacture the porous tube 42.

The diameter of the porous tubes 42 may be 2 to 20 times, preferably 3 to 15 times, and more preferably 5 to 10 times the diameter of the hollow fiber membranes 41. In more detail, the diameter of the porous tubes 42 may be 10 to 50 mm. If the diameter of the porous tubes 42 is less than 2 times the diameter of the hollow fiber membranes 41, an excessively large number of porous tubes 42 should be installed so as to achieve the effects of the porous tubes 42 and, if the diameter of the porous tubes 42 exceeds 20 times the diameter of the hollow fiber membranes 41, a space for installation of the hollow fiber membranes 41 may become narrow due to the porous tubes 42.

1 porous tube 42 per 200 to 2000 hollow fiber membranes 41, preferably 1 porous tube 42 per 500 to 1500 hollow fiber membranes 41, and more preferably 1 porous tube 42 per 800 to 1300 hollow fiber membranes 41 may be provided. If the number of the porous tubes 42 is less than 1 porous tube 42 per 200 hollow fiber membranes 41, the number of the installed porous tubes 42 may be excessively small and, if the number of the porous tubes exceeds 1 porous tube 42 per 2000 hollow fiber membranes 41, the effects of the porous tubes 42 may not be achieved.

TEST EXAMPLES: MANUFACTURE OF WATER EXCHANGE MODULES

Test Example 1

Hollow fiber membrane bundles, one bundle including 14,000 polysulfone hollow fiber membranes (having an outer diameter of 900 μm and an inner diameter of 800 μm) and 10 porous tubes including pores formed by punching (having a diameter 10 mm and a pore diameter of 3 mm, and a ratio of the whole area of the pores to the whole area of the side surface being 30% by area), are disposed in a housing with a polygonal cross-section (having a width of 250 mm, a length of 250 mm and a height of 500 mm).

Both ends of the housing are covered with caps for formation of potting parts, and a potting composition is injected into spaces between the hollow fiber membrane bundles and a space between the hollow fiber membrane bundles and the housing and is then hardened so as to be sealed. After the caps for formation of potting parts are removed, ends of the hardened potting composition are cut so as to form potting parts in which ends of the hollow fiber membrane bundles are exposed to the cut ends of the hardened potting composition, and both ends of the housing are covered with housing caps, thus manufacturing a water exchange module.

Test Example 2

Hollow fiber membrane bundles, one bundle including 14,000 polysulfone hollow fiber membranes (having an outer diameter of 900 μm and an inner diameter of 800 μm) and 10 porous tubes including pores formed by punching (having a diameter 10 mm and a pore diameter of 3 mm, and a ratio of the whole area of the pores to the whole area of the side surface being 40% by area), are disposed in a housing with a polygonal cross-section (having a width of 250 mm, a length of 250 mm and a height of 500 mm).

Both ends of the housing are covered with caps for formation of potting parts, and a potting composition is injected into spaces between the hollow fiber membrane bundles and a space between the hollow fiber membrane bundles and the housing and is then hardened so as to be sealed. After the caps for formation of potting parts are removed, ends of the hardened potting composition are cut so as to form potting parts in which ends of the hollow fiber membrane bundles are exposed to the cut ends of the hardened potting composition, and both ends of the housing are covered with housing caps, thus manufacturing a water exchange module.

Test Example 3

Hollow fiber membrane bundles, one bundle including 14,000 polysulfone hollow fiber membranes (having an outer diameter of 900 μm and an inner diameter of 800 μm) and 10 mesh-type porous tubes (having a diameter 15 mm and a pore diameter of 2 mm, and a ratio of the whole area of the pores to the whole area of the side surface being 30% by area), are disposed in a housing with a polygonal cross-section (having a width of 250 mm, a length of 250 mm and a height of 500 mm).

Both ends of the housing are covered with caps for formation of potting parts, and a potting composition is injected into spaces between the hollow fiber membrane bundles and a space between the hollow fiber membrane bundles and the housing and is then hardened so as to be sealed. After the caps for formation of potting parts are removed, ends of the hardened potting composition are cut so as to form potting parts in which ends of the hollow fiber membrane bundles are exposed to the cut ends of the hardened potting composition, and both ends of the housing are covered with housing caps, thus manufacturing a water exchange module.

Comparative Example

Hollow fiber membrane bundles, one bundle including 14,000 polysulfone hollow fiber membranes (having an outer diameter of 900 μm and an inner diameter of 800 μm), are disposed in a housing with a polygonal cross-section (having a width of 250 mm, a length of 250 mm and a height of 500 mm).

Both ends of the housing are covered with caps for formation of potting parts, and a potting composition is injected into spaces between the hollow fiber membrane bundles and a space between the hollow fiber membrane bundles and the housing and is then hardened so as to be sealed. After the caps for formation of potting parts are removed, ends of the hardened potting composition are cut so as to form potting parts in which ends of the hollow fiber membrane bundles are exposed to the cut ends of the hardened potting composition, and both ends of the housing are covered with housing caps, thus manufacturing a water exchange module.

[Test: Measurement of Performance of Manufactured Potting Parts]

Dry air of 50 g/sec was introduced into the inside and outside of the hollow fiber membranes of the water exchange modules manufactured by Test Examples 1 to 3 and Comparative Example, the outside of the hollow fiber membranes was fixed under conditions of a temperature of 70° C. and a humidity of 90%, the inside of the hollow fiber membranes was fixed under conditions of a temperature of 40° C. and a humidity of 10%, and gas-gas humidification was carried out.

Humidification performance was measured by measuring the temperature and humidity of a point, from which air flowing inside the hollow fiber membranes is humidified and then discharged, and converting the same into a dew point, and Table 1 below shows acquired results.

TABLE 1

| Division | Comparative Example | Test Example 1 | Test Example 2 | Test Example 3 |
|---|---|---|---|---|
| Humidification performance (° C.) | 48 | 56 | 58 | 53 |

With reference to Table 1, it may be understood that the water exchange modules manufactured by Test Examples 1 to 3 have better humidification performance than the water exchange module manufactured by Comparative Example.

As apparent from the above description, a hollow fiber membrane module in accordance with the present invention removes a region, into which a fluid flowing outside a hollow fiber membrane bundle has difficulty in permeating, thus allowing the fluid to uniformly flow. Therefore, even if hollow flow membranes are highly integrated, performance of the hollow fiber membrane module may be maximized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hollow fiber membrane module comprising:
   a housing including a first fluid inlet, a first fluid outlet, a second fluid inlet, and a second fluid outlet;
   diaphragms each extending from an inner surface of the housing thereby partitioning an inner space of the housing into a plurality of sections;
   a vacant porous tube disposed in each of the plurality of sections, the vacant porous tube having closed ends and including a plurality of pores formed on a side surface thereof; and
   a hollow fiber membrane bundle disposed in every each of the plurality of sections, the hollow fiber membrane bundle including a plurality of hollow fiber membranes so that a first fluid flows inside the hollow fiber membranes and a second fluid flows outside the hollow fiber membranes,
   wherein each of the diaphragms has at least one fluid flow hole through which the second fluid flows.

2. The hollow fiber membrane module according to claim 1, wherein the vacant porous tube is disposed so that the length direction of the vacant porous tube coincides with the length direction of the hollow fiber membranes.

3. The hollow fiber membrane module according to claim 1, wherein the side surface of the vacant porous tube is formed in a mesh type.

4. The hollow fiber membrane module according to claim 1, wherein the diameter of the vacant porous tube is 2 to 20 times the diameter of the hollow fiber membranes.

5. The hollow fiber membrane module according to claim 1, wherein the diameter of the pores of the vacant porous tube is 1 to 10 mm.

6. The hollow fiber membrane module according to claim 1, wherein a ratio of the whole area of the pores of the vacant porous tube to the whole area of the side surface of the vacant porous tube is 10 to 50% by area.

7. The hollow fiber membrane module according to claim 1, wherein the hollow fiber membrane bundle includes 200 to 2000 hollow fiber membranes.

8. The hollow fiber membrane module according to claim 1, wherein the cross-section of the housing has a circular shape or a polygonal shape.

9. The hollow fiber membrane module according to claim 1, wherein the housing further includes:
   a housing body having both ends opened and including the second fluid inlet and the second fluid outlet formed on the outer surface thereof; and
   housing caps combined with the respective ends of the housing body and including the first fluid inlet and the first fluid outlet.

10. The hollow fiber membrane module according to claim 1, further comprising potting parts configured to fix both ends of the hollow fiber membranes to the housing and contacting both ends of the housing so as to be sealable.

11. The hollow fiber membrane module according to claim 1, being any one selected from the group consisting of a water exchange module, a heat exchange module, a gas separation module and a water treatment module.

* * * * *